Figure 1:
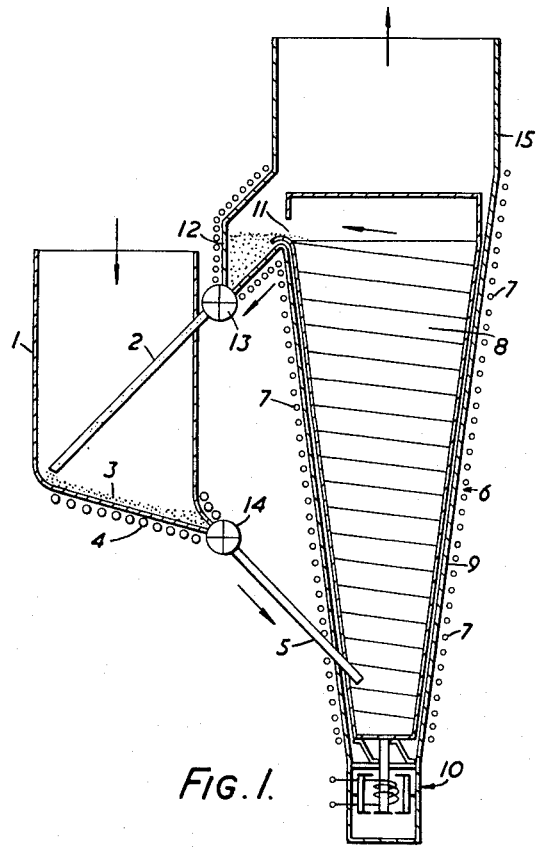

Oct. 12, 1965  T. KRAUS  3,210,915
SORPTION PUMP FOR PUMPING OFF GASES AND VAPORS
Filed March 29, 1961

INVENTOR

BY *Thaddäus Kraus*

ATTORNEY

United States Patent Office 3,210,915
Patented Oct. 12, 1965

3,210,915
SORPTION PUMP FOR PUMPING OFF
GASES AND VAPORS
Thaddäus Kraus, Vaduz, Liechtenstein, assignor, by mesne
assignments, to Bendix-Balzers Vacuum, Inc., Wilmington, Del., a corporation of Delaware
Filed Mar. 29, 1961, Ser. No. 106,995
2 Claims. (Cl. 55—179)

Sorption apparatus for pumping off gases and vapors, in which the sorbent is introduced into the vessel to be evacuated and is removed from it again after having been loaded with gas, have been repeatedly suggested. By the term "sorbent" hereinafter used, all those substances are to be referred to which are capable of taking in gases, regardless of whether by absorption, adsorption, capillary condensation, solution processes or chemical reaction.

Sorption apparatus, in which a certain quantity of a sorbent is introduced once into the vessel to be evacuated, have proved very effective but are limited to vessels of small volume and/or to short periods of operation. Proposals for carrying out this method continuously could not achieve acceptance in practice since the efficiency of such devices was low, perhaps because, by the conveyer mechanism for introducing the sorbent into the vessel to be evacuated, gases were again carried back into the vessel. It has been attempted to overcome the low efficiency by loading the sorbent with gases or vapor as completely as possible on the pump side in that electrical fields were applied which accelerated the molecules to be pumped off towards the sorption surface having been ionised in some way, i.e. as it were to shoot them into said surface. By this higher expenditure of energy a slightly better efficiency has been attained, but the basic disadvantage of the re-introduction of gases from the preliminary vacuum into the vacuum vessel by the carrier of the sorbent has not been obviated.

The present invention has the principal object of providing a sorption pump obviating the contamination of the vessel to be pumped out with gas carried back to it by a conveyer moving in and out of it.

With this and other objects in view which will become apparent from the following description and the accompanying drawings I provide apparatus for the pumping off of gases and vapors by sorption comprising the steps of continuously sluicing a loose, granular sorbent by itself into a space to be pumped out, and continuously sluicing the said sorbent loaded with gas and vapors by itself out of the said space.

Preferably I provide apparatus for the pumping off of gases and vapors by sorption comprising the steps of continuously sluicing a loose, granular sorbent by itself into a space to be pumped out, continuously sluicing the said sorbent loaded with gas and vapors by itself out of the said space into a second space, regenerating the said sorbent in the said second space, and recycling the regenerated sorbent into the said space to be pumped off.

For example apparatus for regenerating comprises heating of the said loaded sorbent.

The apparatus may comprise cooling the said regenerated sorbent prior to recycling the same into the said space to be pumped off or cooling the said loaded sorbent before regenerating the same. The said apparatus, if applied to the generating of a high vacuum, may comprise apparatus for evacuating of the said second space to a preliminary vacuum.

I also provide a sorption pump comprising in combination: a vessel to be pumped off having a sloping bottom, a first sluice means issuing into the said vessel and in operation continuously applying loose granular sorbent to one end of said sloping bottom, and a second sluice means issuing out of the said vessel and in operation continuously discharging loaded sorbent from the other end of said bottom out of said vessel.

This sorption pump may comprise a storage container connected to the said first sluice means and in operation containing the loose granular sorbent to be sluiced into the said vessel, and/or cooling means operatively connected to, and in operation cooling at least one of the said sluice means. Preferably said first and second sluice means are inclined tubes, in operation completely filled by the said sorbent passing through the same.

In one embodiment the said sorption pump comprises a regenerator zone interposed between the said second sluice means and the said first sluice means, and conveyer means recycling the loaded sorbent through the said regenerator zone and as regenerated sorbent to the said first sluice means, and then preferably the said conveyer means are vibratory but otherwise stationary and in operation convey the said sorbent by vibration without bodily moving along with the said sorbent. The said regenerator zone and the said conveyer means may be arranged outside the said vessel.

In another embodiment, particularly forming a vacuum sorption pump I provide in combination: a vessel to be evacuated, at least two sorption pump stages arranged in series each having a sorption zone and a regeneration zone in operation containing a layer of loose granular sorbent, the sorption zone of the first stage being in communication with the said vessel and the regeneration zone of each stage being in communication with the sorption zone of the adjacent stage, except the regeneration zone of the last stage which is in communication with an external preliminary vacuum source, sluice means connecting the two zones of each stage with one another, loaded sorbent from a sorption zone in operation passing through one of the said sluice means to the regeneration zone of the same stage, and vibratory conveyer means in operation recycling regenerated sorbent from a regeneration stage through another of the said sluice means to the sorption zone of the same stage. This embodiment may comprise an inverted cone arranged inside the said vessel, resilient sealing means connecting the said cone near its apex to the said vessel, discs arranged with circumferential clearance inside the said cone and forming partitions, heating means and cooling means arranged around the said cone in successive annular ranges from the apex towards the base thereof, the said cone forming the said vibratory conveyer, the said partitions separating the said pump stages from one another, the said heating means and cooling means being associated with the said regeneration and sorption zones, respectively, the said circumferential clearances forming the said sluice means from said regeneration zone to the sorption zone of each stage, and comprising tubes passing through the said partitions and forming the said sluice means from a sorption stage to the regeneration zone of each stage, the apex of the said cone being in communication with the said external preliminary vacuum source.

Figure 2:
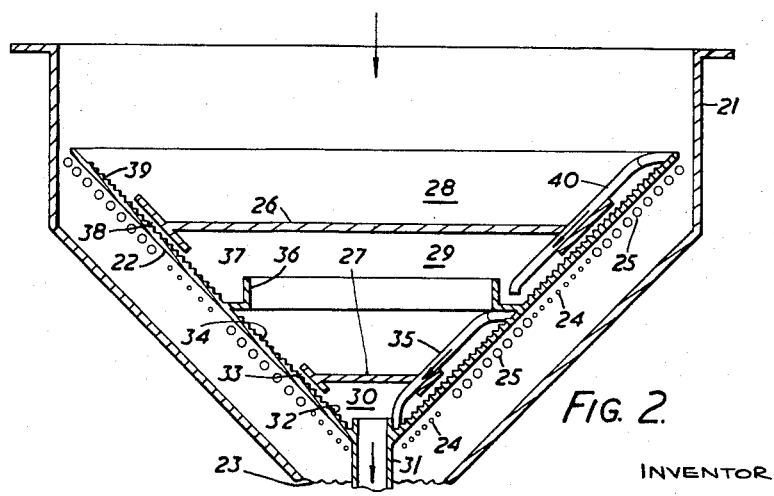

These and other features of my present invention will be clearly understood from the following description of two embodiments thereof given by way of example with reference to the accompanying drawings, of which:

FIG. 1 is a diagrammatic longitudinal section of a single stage pump, and FIG. 2 a part-section of a two stage pump.

In the diagrammatic FIGURE 1, 1 denotes the vessel to be evacuated (or a pipe connected to the same), 2 a tube, through which the sorbent 3 is supplied, which then flows over an inclined wall face of the vessel cooled by cooling pipes 4, and binds the molecules coming from the gas space. The sorbent loaded with gas is then passed through a tube 5 to a regenerator 6, which contains a vibratory (upward) conveyor track 8 heatable by an electric heating coil 7, said conveyor track being, if desired, of any known design and being housed in a casing 9. The drive of the conveyor track is effected by an electro-mechanical vibrator 10 built into the bottom of the casing 9.

During the operation of this device the sorbent loaded with gas gets through the tube 5 into the lower part of the conveyor track. From there it rises slowly along the heated wall of the regenerator, while the gases are being desorbed, up to an overflow 11, from where it flows back through the likewise heatable lateral branch 12, which may be designed, if desired, as a storage compartment, and through tube 2 back into the vacuum vessel, where it is available anew for the pumping operation.

13 and 14 are valves, which are convenient for completely isolating the vacuum vessel during interruptions of operation. The valves 13 and 14 may also serve for carrying out the method in the manner of introducing a pre-determined quantity of sorbent into the vacuum vessel through the valve 13, and after its loading with gas dischargeing it through the valve 14. The valves 13 and 14 are however not necessary, when the operation is carried out continuously. For this purpose the tubes 2 and 5 may be provided with cooling means and used as sluices, through which the loose granular sorbent is introduced into the vessel to be evacuated in such a manner that it fills the whole cross section area of the tube, and is discharged likewise.

The following materials are considered as sorbents for the operation of the pump described, e.g. granular silica gel, zeolites, aluminium oxides, activated charcoal and metal powders. For certain gases specific sorbents are known, e.g. titanium and zirconium for hydrogen, water vapor, oxygen and nitrogen. By introducing specific sorbents the device described may also be used for the purifying of gases (even under normal pressure). It then acts as a pump only for those gas components for which the sorbent used is specific. When lower gas pressures in the vessel are sought, it has to be considered that for a certain sorbent the ratio of the pressure on the sorption side (pumping side) to the pressure on the desorption side is constant—provided of course that no gases are carried back from the desorption side to the sorption side as was the case with the previously known sorption pumps having a carrier moving with the sorbent. Therefore, when lower pressures, e.g. high vacua, are desired, it is convenient to keep the desorption side under a preliminary vacuum by means of a preliminary evacuation pump, which may be connected at 15, or several pumps may be arranged in series. A multistage sorption pump of the kind according to the present invention will be described hereinafter with reference to FIGURE 2.

In FIGURE 2, 21 denotes a casing, which may be connected by means of flanges to the vessel to be evacuated. 22 is a cone which is set into vibration from below through a flexible membrane 23 by a vibrator of any type desired (not shown). The cone 22 has annular zones heatable by electrical heating wires 24, and annular zones coolable by cooling pipes 25, and its internal space is subdivided by auxiliary partitions 26 and 27 into compartments 28, 29 and 30. A preliminary vacuum pump is connected to the pipe 31.

For setting this device in operation, the helical vibratory conveyor track arranged on the inside of the cone 22 is covered with a sorbent, the casing 21 is connected to the vessel to be evacuated, and a preliminary vacuum is established by means of an auxiliary pump. The heating means 24 and cooling means 25 and the vibrator are switched on, and the following operation ensues:

The sorbent actually located in the heated zone 32 is desorbed, and is gradually moved out of the regeneration space 30 on the conveyor track through the annular gap 33 into the pumping space 29. It then moves over the cooling zone 34, where it exerts the pumping action desired on the gases contained in the space 29. When reaching the upper end of the cooling zone 34, the sorbent, which by then is loaded with gas, slides through the return pipe 35 penetrating through the partition wall 27 back into the regeneration chamber 30, where the cycle begins anew. In this manner a better vacuum is generated in the chamber 29 than that which prevails in the chamber 30 serving as a preliminary vacuum stage for the high vacuum stage proper arranged ahead of it.

The high vacuum stage consists of an annular trough 36, a heating (regeneration) zone 37, the partition wall 26, which leaves a gap 38 for the passage of the sorbent, the sorption zone 39 and the return pipe 40, and operates in a manner analogous to that of the first stage, but with the difference that owing to the good starting vacuum in the chamber 29 the final vacuum in the chamber 28 is considerably better.

It is clear that more than two sorption stages may be arranged in series when a particularly high end vacuum is to be attained. It is then not necessary to give the vibratory conveyor tracks the conical shape herein illustrated; for example it may alternatively be arranged in the form of a helical groove on the inside of a cylinder. The conical shape takes however into account the fact that the gas volumes to be handled increase as the pressure is reduced.

Pumps according to the present invention may be operated at the full efficiency of the sorbents used since, as stated hereinabove, no carrier moving with the sorbent through the vessel to be evacuated is present. The vibratory conveyor track, as far as such a track is used at all in the vacuum vessel, only moves the sorbent along but does not move along itself. On the other hand, other known conveyor means may be used at will in the regeneration zone, even those which move along with the material.

In a simplified form of carrying out the invention, the regeneration cycle may be dispensed with, and one may, instead, merely pass loose, granular sorbent from a storage container into the vessel to be evacuated, and after it has been loaded with gas collect the same in another storage container, which is sealed somehow (e.g. by the sorbent itself) from the vessel to be evacuated.

When the vessel to be evacuated contains gases that can be sorbed as well as gases that cannot be bound to the sorbents used, e.g. noble gases, the non sorbable gases may be pumped off by a preliminary pump combined with the sorption pump, and at the same time dimensioning the gaps 33, 38 so wide, that the gases incapable of sorption may, owing to the partial pressure gradient established, travel through the sorption pump in the direction towards the preliminary pump, while on the other hand the gases capable of sorption released in the regeneration chambers of the sorption pump cannot reach the gas space of the vacuum vessel at all or only to a negligible amount in spite of the large width of the gaps since they are removed in these gaps by the sorbent likewise passing through the same.

While I have described herein and illustrated in the accompanying drawings what may be considered typical and particularly useful embodiments of my said invention, I wish it to be understood that I do not limit myself to the particular details and dimensions described and illustrated; for obvious modifications will occur to a person skilled in the art.

What I claim as my invention and desire to secure by Letters Patent, is:

1. A vacuum pump having a preliminary vacuum pump and utilizing loose granular sorption material for evacuating a vessel comprising: at least two sorption pumps arranged in series, each having a sorption chamber and a regeneration chamber separated by wall means, the sorption chamber of the first stage sorption pump being adapted for communication with said vessel and the regeneration chamber of each sorption pump stage being in communication with the sorption chamber of the adjacent sorption pump stage except the regeneration chamber of the last stage which is adapted to be connected to said preliminary vacuum pump, sluice means for each sorption pump for conveying sorption material from the sorption chamber to the regeneration chamber, and vibratory conveyor means for each sorption pump for conveying sorption material from the regeneration chamber to the sorption chamber without bodily accompanying the sorption material, said sorption material on said vibratory conveyor means forming a seal between said wall means and said conveyor means to prevent gaseous communication between the chambers of a sorption pump.

2. A vacuum pump as claimed in claim 1 wherein the vibratory conveyor means is conically shaped and the wall means are disc arranged with circumferential clearance inside the conical conveyor means, heating means and cooling means arranged around the conical conveyor in successive annuli from the apex toward the base thereof, the said heating means and cooling means being associated with the said regeneration and sorption chambers respectively, the sorption material on said conveyor means adapted to fill the clearances between the circumferences of said discs and said conveyor means, and wherein the sluice means are tubes which pass through said discs.

References Cited by the Examiner
UNITED STATES PATENTS

| | | | |
|---|---|---|---|
| 2,009,569 | 7/35 | Wallis et al. | 55—390 X |
| 2,103,400 | 12/37 | Weckerly | 222—55 |
| 2,160,863 | 6/39 | Hickman | 230—69 |
| 2,270,903 | 1/42 | Rudbach | 55—79 |
| 2,544,214 | 3/51 | Berg | 55—390 X |
| 2,547,409 | 4/51 | Prescott | 141—65 X |
| 2,594,615 | 4/52 | Berg | 55—61 X |
| 2,684,870 | 7/54 | Berg | 55—390 X |
| 2,770,932 | 11/56 | Polye | 141—8 X |

REUBEN FRIEDMAN, Primary Examiner.

GEORGE D. MITCHELL, LAVERN GEIGER, LOUIS J. DEMBO, Examiners.